Feb. 28, 1961 E. L. BLACKMAN 2,973,221
AUTOMOBILE PANEL-OPENING CONSTRUCTION
Filed Dec. 24, 1957 4 Sheets-Sheet 1

INVENTOR.
EDWARD L. BLACKMAN
BY
Kenyon & Kenyon
ATTORNEYS

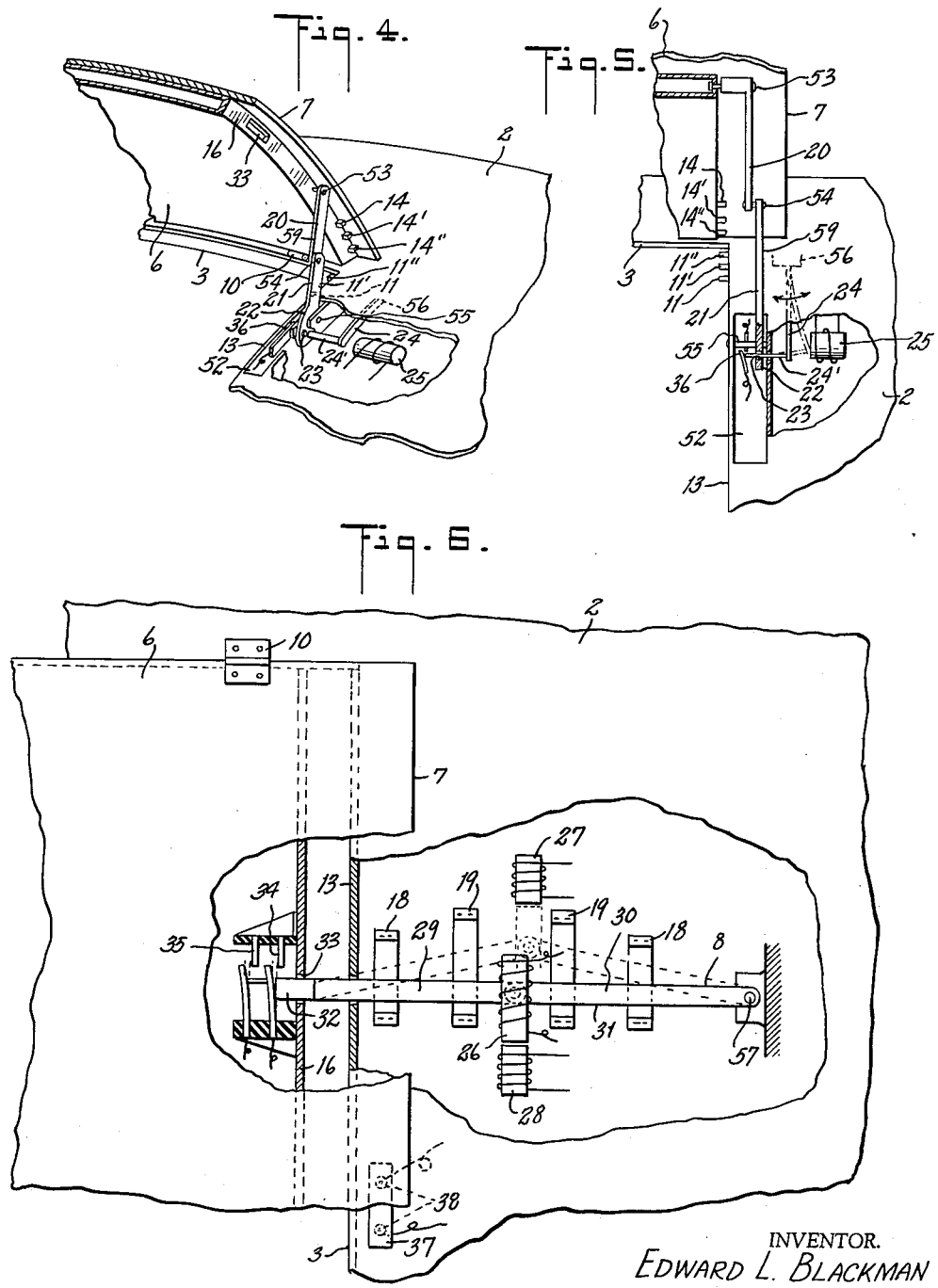

Feb. 28, 1961  E. L. BLACKMAN  2,973,221
AUTOMOBILE PANEL-OPENING CONSTRUCTION
Filed Dec. 24, 1957  4 Sheets-Sheet 3
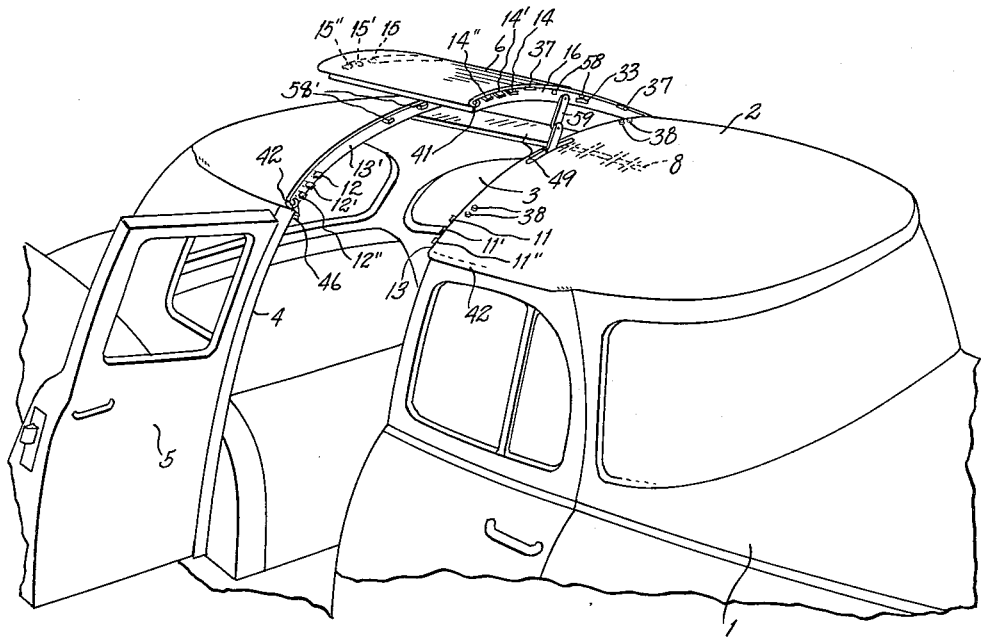
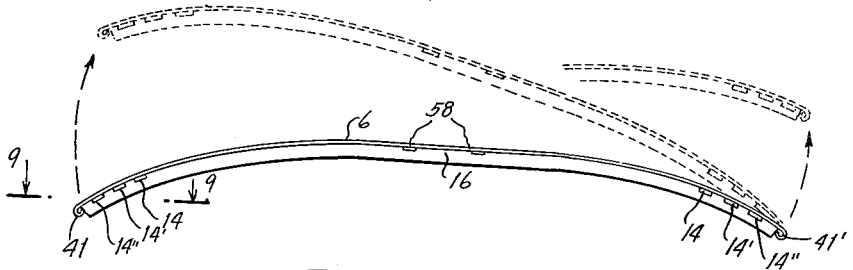
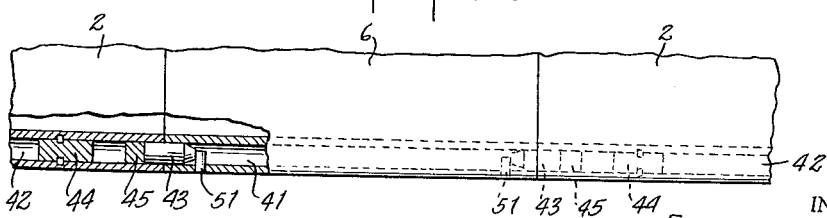
INVENTOR.
EDWARD L. BLACKMAN
BY
Kenyon & Kenyon
ATTORNEYS

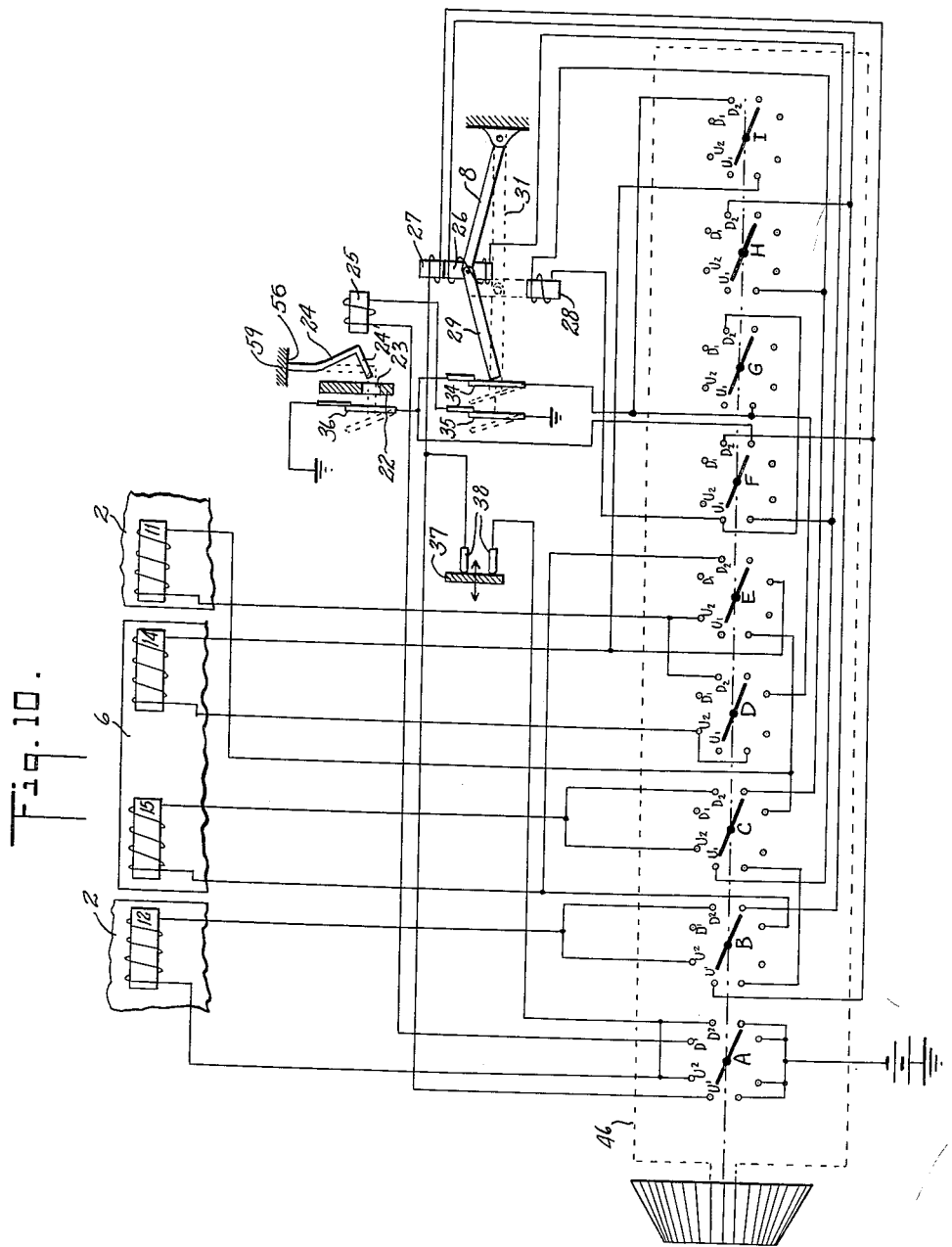

{ # United States Patent Office 2,973,221
Patented Feb. 28, 1961

2,973,221

AUTOMOBILE PANEL-OPENING CONSTRUCTION

Edward L. Blackman, 15 Ellicott Place,
Staten Island, N.Y.

Filed Dec. 24, 1957, Ser. No. 705,030

20 Claims. (Cl. 296—44)

My invention relates to the construction of automobile bodies and to an improvement therein. More particularly, my invention relates to magnetic means for opening and closing moveable panels which cover various openings located in the body of an automobile.

There are many panel-covered openings in an automobile body which require convenient and automatic means for their opening and closing, sometimes remotely. Such openings which are usually necessary, and which are adaptable to automatic operation include, for example, doorways, windows, ventilation openings, trunkroom openings, motor-hood openings, skylight openings, and the like. My magnetic means may be used to operate the panels which close any or all of these openings, and it is an object of my invention to provide magnetic means for doing the same.

But modern styling of automobile bodies has created an additional problem which my invention is particularly adapted to overcome, and therefore to which my invention is particularly directed.

A major objection to modern automobile styling is that the roof of the vehicle is extremely low. This may be necessary and desirable for the purpose of appearance, but has created the problem of providing sufficient headroom at the doorway passages of the vehicle for convenient movement of passengers and packages therethrough. For example, it is usually necessary that the passenger bend down uncomfortably when entering or leaving the automobile to avoid striking his head on the roof portion above the doorway. It has become almost impossible to conveniently enter into or exit from an automobile without removing the hat.

It is therefore a primary object of my invention to provide increased headroom in an automobile body at a location, or at locations of entrance into or exit from the vehicle at times of such entrance and exit.

Heretofore, the problem of providing increased headroom at doorway passages in an automobile has been partially solved by providing rather small recesses or openings above the doorways which are closed by extensions on the upper portion of the doors which conform to the shape of such recesses, or which are closed by panels hingedly connected to the doors, or to the roof of the vehicle above the doors, which are mechanically arranged to open and close in conjunction with the movement of the doors. Where the headroom openings are closed by fixed extensions of the doors, the openings must necessarily be small, being rather shallow in depth or transverse direction, because of the inconvenient shape of the door extension when the door is in an open position. Where hingedly connected panels are operated mechanically to open and close such headroom openings, the bulk and the necessarily rather awkward arrangement of the required mechanical linkages also limit the sizes of the openings which may be obtained, and cause difficulty in obtaining a weatherproof and rattle-free closing of the panel over the opening. These mechanical arrangements may also detract from the appearance of the vehicle, and from the convenience of travel therein.

It is therefore another object of my invention to provide means to open a panel moveably attached to a roof portion of an automobile body adjacent to and above a doorway passage therein, which opening means may be wholly magnetic or wholly mechanical, or may be partly magnetic and partly mechanical, and to provide means to close the said panel magnetically in cooperation with its weight, or by its weight alone, thereby to obtain substantially increased headroom at times of movement of passengers or packages through the doorway. By such magnetic means of operation, the area of headroom opening may be conveniently made greater than has been achieved heretofore, its depth or transverse length extending all the way to the longitudinal centerline of the vehicle body or beyond, and the bulk or size of the operating means and the number of moving parts thereof may be maintained at a minimum.

Although it is possible to devise a mechanical arrangement of permanent magnets to achieve the results of my invention, I prefer to use electromagnets for the purpose, and it is therefore a further object of my invention to provide an electrically operated system including electromagnets for automatically and controllably operating a moveable panel in an automobile body, such as a panel which covers a headroom opening in the vehicle.

It is a further object of my invention to provide a magnetically operated moveable panel in an automobile body having locking means to lock the panel in an open position and in a closed position.

It is still another object of my invention to provide a single, moveable roof panel covering multiple headroom openings in the roof of an automobile which are located between two opposing side access doorways of the vehicle, which panel is operable alternately to provide increased headroom above either doorway by means, wholly or in part, comprising electromagnets.

It is still another object of my invention to combine any of my aforesaid electromagnetic means for opening and closing a panel in an automobile with electromagnetically activated mechanical locking means to automatically, in controllable sequential manner, lock and unlock the panel in a predetermined position.

It is a further object of my invention to provide electrically operated systems including electromagnets to activate each of the aforesaid locking means, the electrically operated systems being electrically and mechanically interconnected with the electrically operated system which controls magnetic opening and closing of a roof panel in an automobile in a manner to provide controlled sequential locking and unlocking of the panel when in alternately open and closed positions.

Still a further object of my invention is to provide locking means for a moveable roof panel in an automobile body which will cooperate with weatherstripping or other weatherproofing means disposed on the panel and on the roof to obtain a weatherproof seal between the panel and the roof when the panel is in a closed position.

Still another object of my invention is to provide a method for obtaining increased headroom in an automobile body above doorway passages at times of passage therethrough by providing a moveable roof panel to close an opening suitably located in the roof of the automobile, and causing the panel to be, sequentially, automatically and electromagnetically unlocked from a closed position, moved to and locked in an open position, and subsequently unlocked from the open position and moved to and again locked in the closed position, the timing sequence of the operation being controllable by the occupant of the automobile.

These and other objects and achievements of my invention will become apparent from the following description, and from the drawings thereof, in which:

Figure 4 is a perspective view of a portion of my moveable panel and of the car roof at the headroom opening to show my open-locking device for locking and unlocking the panel when in open position, a portion of the roof of the car being shown in cutaway section.

Figure 5 is a direct side view of a part of my panel in open position above a portion of the roof of the car at the headroom opening to further show the arrangement of my open-locking device, a portion of the roof and my locking means being shown in section, and further to show the overlying arrangement of my magnets.

Figure 6 is a plan view of a portion of my moveable panel in closed position above a portion of the automobile roof at the headroom opening, partially in section, to show the location and arrangement details of my electromagnetically activated closed-locking device for locking and unlocking the panel when in closed position, the locking device being shown in locked position.

Figure 7 is a perspective view of an automobile body having my moveable panel extending fully across the transverse width of the roof, the panel being shown in open position.

Figure 8 is a front view elevation of the moveable panel shown in Figure 7, and showing the operation thereof.

Figure 9 is a sectional side view taken at section 9—9 of Figure 8 showing details of the moveable panel connecting means to be used with the panel style shown in Figures 7 and 8.

Figure 10 is a schematic electrical circuit diagram to show at least an operable arrangement for electrically and mechanically interconnecting my three electrically operated systems to be hereinafter described.

Figure 1:
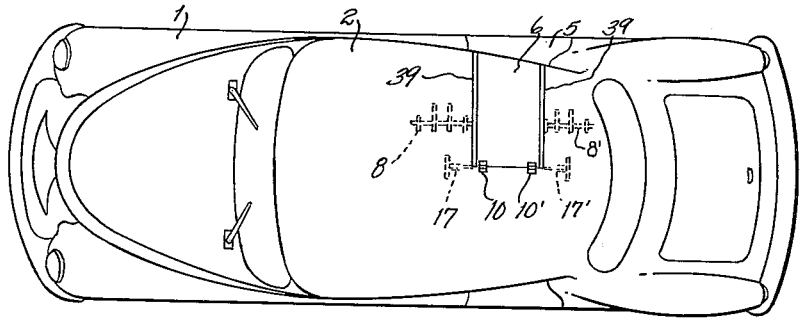
Figure 1 is a plan view of an automobile body, showing my moveable roof panel in closed position covering a headroom opening in the roof of the automobile located, for example, adjacent the right rear door of the vehicle, which door is also shown in closed position.

In the drawings, the roof 2 of an automobile body 1 is provided with a headroom opening 3 which is suitably located adjacent to and above a side access doorway 4 of the automobile. For convenience, I have shown the headroom opening 3 adjacent the rear right door 5 of a four-door vehicle body, but it is to be understood that a suitable headroom opening may be provided over any doorway, and over more than one doorway of the same automobile. The headroom opening 3 over any single doorway 4 may be formed beginning at or near the longitudinal centerline of the roof 2, and extending transversely the full half-width of the roof 2 so that, when the car door 5 is opened, a clear, unobstructed space is provided which is formed by the doorway 4 and the headroom opening 3 through which passengers may conveniently pass to enter or to leave the vehicle. The headroom opening 3 should, in longitudinal direction, approximate the width of the doorway 4, about three feet, and, extending transversely from the center of the car, is preferably in size about two feet, which is sufficient space to comfortably accommodate the head and shoulders of a large person passing therethrough.

A moveable roof panel 6 is fitted over the headroom opening 3 in a manner to close the opening 3 completely when so desired. The moveable panel 6 should be shaped to conform to the curvature of the roof, and preferably should have flanges 7 and 7' on the transverse sides thereof. The moveable panel 6 should be made from a thin piece of strong material such as steel, plastic, or fiberglass, which has some spring-like qualities to assist obtaining a tight fit in cooperation with my closed-locking devices 8 and 8' as will be hereinafter described. Because the operation of my moveable panel 6 is magnetic in nature, the panel 6 or at least the strips 9 thereof including the panel flanges 7 and 7', and at least the peripheral portions of headroom opening 3, such as at strip 9' thereof, should be made of material not subject to magnetic attraction.

The particular means of moveably attaching panel 6 to roof 2 will correspond with the desired method of opening and closing the panel, as by lifting the panel 6 vertically, or by sliding the panel 6 along or into the roof, or by rotating the panel 6 about hinges suitably arranged along either the transverse sides of the headroom opening 3, or along the centermost longitudinal side thereof. Preferably, my moveable panel 6 is rotatably attached to roof 2 by hinges 10 and 10', located at or near the centerline of the roof 2. For simplicity, my drawings show two hinges 10 and 10' so located, but it is to be understood that any suitable type of hinge connection may be used.

Electromagnets 11 and 12 are affixed to the roof 2, preferably to the underside thereof, at the roof opening on the transverse edge portions 13 and 13' of the headroom opening 3 proximate to the hinges 10 and 10', as shown in several figures of my drawings. As shown in Figures 2, 4, 5, 7 and 8, electromagnets 11 and 12 may be a plurality of thin, flat electromagnets 11, 11' and 11", and 12, 12' and 12". They are affixed in a manner permitting their projection into headroom opening 3 a short distance, say a fraction of an inch. It is preferred, however, that electromagnets 11 and 12 be thin, flat, horseshoe-type magnets. In my drawings moveable panel 6 is made to fit over the headroom opening 3 so that panel 6 overlaps roof 2 when panel 6 is in closed position but it is to be understood that the panel may also fit flush with roof 2. The electromagnets 11 and 12 should be located along transverse edge portions 13 and 13' of headroom opening 3 so as to accommodate electromagnets affixed to panel 6 in a manner to be described.

Electromagnets 14 and 15 are affixed to the moveable panel 6, preferably to the underside of flanges 7 and 7' thereof, at the transverse edge portions 16 and 16' thereof, located so as to substantially overlie electromagnets 11 and 12, respectively, in the roof 2 when panel 6 is in a position closing headroom opening 3. As shown in Figures 2, 4, 5, 7 and 8, electromagnets 14 and 15 may be a plurality of thin, flat electromagnets 14, 14' and 14", and 15, 15' and 15". They are affixed in a manner permitting their projection into headroom opening 3 a short distance so as to substantially overlie electromagnets 11, 11' and 11", and 12, 12' and 12", respectively. It is preferred, however, that electromagnets 14 and 15 also be thin, flat, horseshoe-type magnets. Thus, electromagnets 14 and 15 as affixed to moveable panel 6 are located correspondingly with electromagnets 11 and 12 affixed to roof 2, so that substantially overlying magnet-pairs result within a small airspace between the roof 2 and the moveable panel 6 in the region proximate to the attachment hinges 10 and 10'. Preferably, each of the projecting end portions of electromagnets 14 and 15 will be located in transverse direction slightly farther away from hinges 10 and 10' than each of the corresponding end portions of electromagnets 11 and 12 so as to provide more efficient utilization of magnetic forces during the opening and closing operations of panel 6 as will become apparent.

To assist the opening operation of moveable panel 6 as will hereinafter be described, it is preferred that thin, flat-type torsion bars 17 and 17' be affixed to the moveable panel 6, in operable alignment with hinges 10 and 10', and to the roof 2 when the panel 6 is in attached position. The torsion bars 17 and 17' are attached to the underside of roof 2 by means of brackets 50 and 50'. Because they will act as would springs to assist the opening operation, torsion bars 17 and 17' are attached in normally loaded condition when the panel 6 is in closed position. Equilibrium of torsional stress conditions should be obtained when panel 6 has been rotated about sixty degrees towards the open position. It is to be understood that coil-type springs, or bent-shaped torsional spring devices may be used in place of torsion bars 17 and 17', however.

Using the preferred embodiment of my invention the entire roof of the automobile has substantially ordinary appearance when moveable panel 6 is in closed position, except for a slight elevation of the panel forming a small coaming surrounding the three sides thereof.

Electromagnets 11, 12, 14 and 15 are a part of an electrically operated system which will be hereinafter referred to as the "first electrically operated system," for automatically moving the panel 6 to a predetermined open or closed position. This first electrically operated system includes several mechanical circuit forming and breaking means, to be hereinafter described. The system is interiorly disposed within the walls of the automobile body 1, the roof 2 and the moveable panel 6, being electrically connected to the ordinary storage battery of the automobile or to an independent electrical source, such as a conveniently located battery. Although this first electrically operated system may be initially energized directly by a manual switch, it is preferred that it be initially energized alternately by certain mechanical action resulting from the action of a second and a third electrically operated system, which control locking devices, in a manner to be explained. The first electrically operated system is also made electrically reversible, at least in part, in order to reverse the polarities of either electromagnets 11 and 12, or of electromagnets 14 and 15, as will also be explained.

Closed-locking devices 8 and 8', for locking moveable panel 6 in a closed position, are affixed by means of brackets 18 and 19, and 18' and 19' to the underside of roof 2 on either side of headroom opening 3, as shown in Figures 1, 2, 6 and 7. Locking device 8 or 8' is shown in detail in Figure 6 and it is to be understood that both closed-locking devices 8 and 8' are operable in the same manner so that explanations hereinafter of the operation of locking device 8 are also applicable to locking device 8'. Locking devices 8 and 8' are activated by an electrically operated system, hereinafter referred to as the "second electrically operated system." This second electrically operated system is interiorly disposed within the walls of the automobile body, and the roof 2, and also includes several mechanical circuit forming and breaking means. It is also electrically reversible in order to reverse the polarities of various electromagnets therein. Electrical energy for the system is also obtained from either the normal storage battery in the automobile, or from an independent battery source. Preferably, this second electrically operated system is electrically and mechanically interconnected with the aforesaid first electrically operated system in order to obtain controlled sequential operation between the two systems, as will be explained. Within the electric circuit which comprises the second electrically operated system is a manually operated switch 46, shown in Figures 2, 7 and 10, for initial energizing of the system, and, in fact, for starting all of the sequential automatic actions involved in my method of providing increased headroom in automobiles.

Open-locking device 59 is comprised of links 20 and 21, for locking moveable panel 6 in an open position. Links 20 and 21 are connected to moveable panel 6 at hinge-point 53, and to roof 2 at hinge-point 55, and are hingedly connected together at hinge-point 54. Preferably, link 21 is formed with leg 22 having locking hole 23 therein. Locking and unlocking action is caused by cooperation of pin 24', a part of leaf spring 24 affixed to roof 2, with locking hole 23, pin 24' passing sequentially into and out of locking hole 23 as locking and unlocking is desired. Leaf spring 24 is affixed to be normally unloaded when pin 24' is in locking position within locking hole 23. Pin 24' is withdrawn by electric activation of electromagnet 25. Locking hole 23 is located such that links 20 and 21 will be prevented, during movement of panel 6 to the open position, from reaching fully aligned relation one to the other. This permits links 20 and 21 to jack-knife properly when panel 6 is moved to the closed position. Other means might be used to insure proper jack-knifing of links 20 and 21 upon moving panel 6 to closed position.

Other parts and features of my invention will be more easily understood when described in connection with an explanation of the operation of my moveable roof panel, which is as follows:

When it is desired to move movable panel 6 to an open position from a closed position with respect to roof 2, so as to obtain increased headroom at the desired access doorway of the automobile, manual switch 46, which is interiorly located within convenient reach of one seated within the car near the said doorway or of one outside the car near said doorway, is moved to a position marked "up-1," whereupon the second electrically operated system becomes initially energized so as to move closed-locking devices 8 and 8' to an unlocked position. Unlocking action of locking devices 8 and 8' is caused by activation of electromagnets 26, 27 and 28, which form a part of locking device 8, in a manner so that electromagnetically opposite-polarities are obtained at the proximate end portions of electromagnets 26 and 27, and electromagnetically like-polarities are obtained at the proximate end portions of electromagnets 26 and 28. Magnetic attraction between electromagnets 26 and 27, assisted by magnetic repulsion between electromagnets 26 and 28, moves electromagnet 26 toward electromagnet 27, causing slat 29 to withdraw from slot 33 in panel 6. Lateral movement of slat 29 is caused by the angular movement of slat 30, pivotally attached at fixed position 57. Slats 29 and 30 move slideably within brackets 18 and 19 which are affixed to the underside of roof 2. At least slat 29 is made of electrically non-conductive material so that, when slats 29 and 30 are in straight line position 31, as shown in Figures 6 and 10, end portion 32 of slat 29 passes into a moveable panel 6 in a manner, not only to cause panel 6 to be mechanically locked in closed position, but also to mechanically hold open the electric circuit forming a part of the first electrically operated system at electro-mechanical contact point 34 therein. Withdrawal of slat 29 therefore simultaneously permits panel 6 to be free to be moved, and closes a part of the electric circuit in the first electrically operated system. Manual switch 46 is thereupon moved to a second position, marked "Up-2," to wholly complete the circuit of the first electrically operated system.

Figure 3:
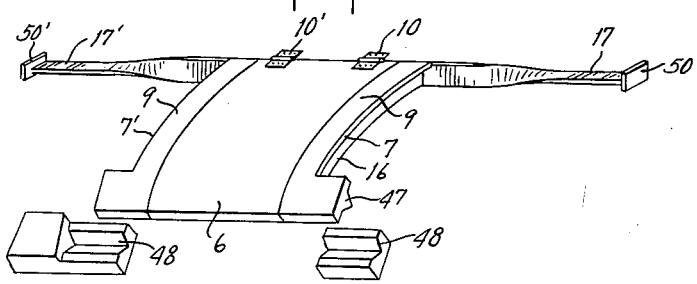
Figure 3 is a perspective view of my moveable panel as detached from the automobile body in partially open position with respect to a portion of the roof of the car, and a preferred structure thereof for seating my moveable panel when in closed position and for moving my panel to an open position by an auxiliary torsion bar attachment.

Energizing of the first electrically operated system causes like polarities to occur upon the proximate end portions of overlying electromagnets 14 and 11 and overlying electromagnets 15 and 12 located between panel 6 and roof 2. Electromagnetic repelling force is thereby created between the magnet-pairs and panel 6 will be moved upward to an open position by this lifting force. Thus, it can be seen that panel 6 may be caused to move to an open position solely by means of directly applied repelling electromagnetic force. However, I prefer to assist the lifting action of the electromagnets 11, 12, 14 and 15 with spring-type mechanical means such as torsion bars 17 and 17'. This is for the reason that it is readily seen that, although the weight of the panel 6 is not great, the leverage exerted by panel 6 against the electromagnetic lifting force may be great. Therefore, because the magnetic lifting force diminishes rapidly as panel 6 moves upward, an auxiliary lifting force is desirable, which force should be of a nature to partially counterbalance the leverage of panel 6 due to its weight. Any mechanical spring-type means may be used to supply the auxiliary lifting force, such as having coil springs attached to the hinges 10 and 10', or providing springs attached between roof 2 and panel 6 bearing upwardly upon panel 6, or by affixing torsion bars 17 and 17' between roof 2 and panel 6, as shown in Figures 1 and 3. Of course, the auxiliary lifting force permitted to be applied by any of these spring-type means should be adjusted in accordance with the type used and the location thereof, and the size and shape of the panel 6 and the weight per square foot thereof, so that the mechanical lifting force exerted thereby will be at all times less than, but not much less than, the total force necessary to continue to lift panel 6 to the desired open position at an elevation of from 45 degrees to 80 degrees with respect to the roof 2.

The weight and inertia of moveable panel 6 is believed sufficient to prevent its rising too rapidly when the magnetic lifting force is applied. However, the lifting speed could be further slowed or controlled by many means including sequential energizing of the plurality of magnets which comprise each of the electromagnets 11, 12, 14 and 15, the magnets farthest from hinges 10 and 10' being energized first, and those nearest the hinges last.

When moveable panel 6 has arrived in open position, it is locked therein by the action of links 20 and 21 and of leaf spring 24. When links 20 and 21 are not in aligned position, pin 24' of leaf spring 24 rests on the area-surface of leg 22. When link 21 arrives in open position, pin 24' will be propelled by the spring-action of leaf spring 24 into locking hole 23 to lock panel 6 in open position. The movement of pin 24' through the hole 23 mechanically breaks the circuit which comprises the first electrically operated system by opening electro-mechanical contact point 36, as shown in Figures 4 and 5, whereupon the current is withdrawn from that system and all of the electromagnets therein are deactivated. The end portion of pin 24', of course, should be made of electrically nonconducting material.

When it is desired to move panel 6 to a closed position, when increased headroom is no longer required, switch 46 is manually moved to a position marked "Down-1," completing an electric circuit to a third electrically operated system to energize electromagnet 25 with polarity such that pin 24' is withdrawn from locking hole 23 in link 21. Thereupon panel 6 is no longer locked in open position. Withdrawal of pin 24' from locking hole 23 also partially closes the electrical circuit of the first electrically operated system by permitting electrical contact to take place at electro-mechanical contact point 36. Further movement of switch 46 to a position marked "Down-2" causes electrical connection of the first electrically operated system in a manner permitting electric current to flow therethrough in reversed direction to electromagnets 14 and 15 located in the moveable panel 6, but in the same direction as during the opening operation to electromagnets 11 and 12 in roof 2. The polarities of magnet pairs 11 and 14, and of magnet pairs 12 and 15 are thereupon electromagnetically opposite, causing magnetic attraction therebetween. This magnetic attraction causes panel 6 to move to a closed position with respect to headroom opening 3. It is to be understood, however, that the polarities of electromagnets 11 and 12 in roof 2 could be reversed, rather than the polarities of electromagnets 14 and 15, as I have above described, to obtain the results of my invention.

Figure 2:
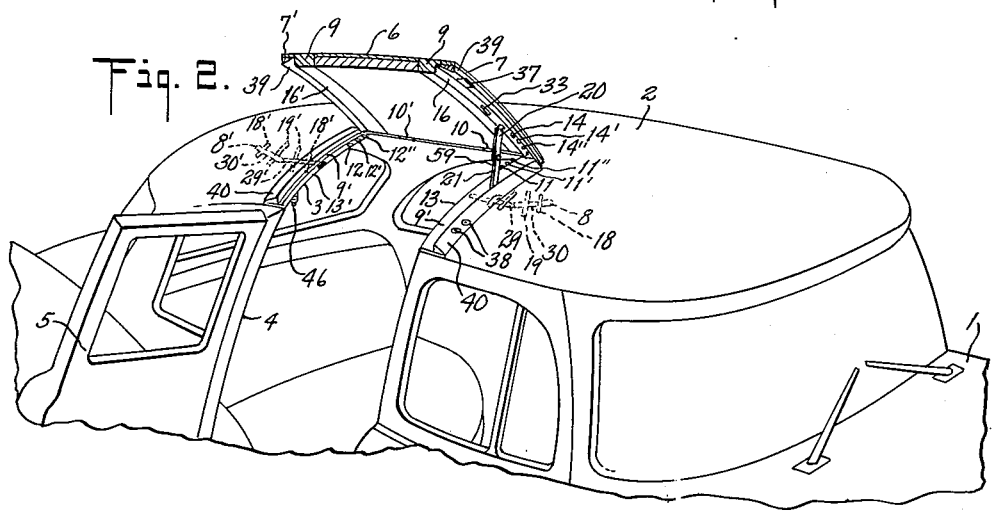
Figure 2 is a perspective view from the right front quarter of the automobile, showing the door of the car and my moveable panel both in an open position, and showing weather-stripping material disposed on the panel and on the roof of the car.

When panel 6 has substantially reached the closed position, locking devices 8 and 8' are energized. This is accomplished by mechanical completion of the electrical circuit which comprises the second electrically operated system. A strip 37 of electrically conducting material, such as copper, is affixed to panel 6 on the underside of the flange 7, as shown in Figures 2 and 6. This strip completes the circuit by physical contact across lead-wires at electro-mechanical contact point 38, which causes current to flow through the second electrically operated system in reversed direction as compared with the aforesaid unlocking operation of locking devices 8 and 8'. Electromagnets 26, 27 and 28 in locking device 8 are thereupon energized in a manner to cause electromagnetic repelling force between electromagnets 26 and 27, and electromagnetic attraction force between electromagnets 26 and 28. Thus, locking devices 8 and 8' are activated so as to cause slats 29 and 30 in locking device 8, and similar slats in locking device 8', to move to aligned position as at position 31, to cause end portion 32 of slat 29 to pass into slot 33 in panel 6 to lock panel 6 in closed position. End portion 32 of slat 29 also moves between lead-wires at electro-mechanical contact point 34 in the first electrically operated system, breaking the electric circuit therein to deactivate electromagnets 11, 12, 14 and 15. The current to locking devices 8 and 8' is simultaneously cut off by mechanical opening of electro-mechanical contact point 35, which can only occur after slats 29 and 30 have been brought into aligned position 31.

When panel 6 is in closed position a weatherproof seal between panel 6 and roof 2 is obtained by weatherstripping 39 and 40, such as rubber, disposed around the perifery of panel 6 and the perifery of headroom opening 3, and further by the clamping action obtained by operation of locking devices 8 and 8'. End portion 32 of slat 29 in locking device 8, and the corresponding end portion in locking device 8', should be made wedge-shaped. Panel 6, as previously described, is made of springy material and should be formed with slightly more transverse curvature than the portion of roof 2 over which it fits. By proper location of the slots 33 and 33' in the transverse edge portions 16 and 16' of panel 6 through which end portion 32 of slat 29, and its corresponding member in locking device 8', must pass, wedging action may be obtained simultaneously as panel 6 is locked in closed position so as to assure sufficient downward pressure of panel 6 to cause a weatherproof seal. The action causes the curvature of panel 6 to expand slightly to conform to the transverse curvature of roof 2.

I have thus described a complete cycle of operation of my invention in its preferred form. Certain modified forms thereof, and certain refinements to the construction of the parts may be desirable, however, to more advantageously achieve the results of my invention.

In Figures 7, 8 and 9, I show a modified form of my invention wherein my moveable panel 6 extends fully across the width of the automobile roof 2 to close headroom openings 3 above each of the opposing side doorways. The automobile body 1, of course, must be adapted to such construction, as for example, by providing a longitudinal connecting member 49, located in the vicinity of the longitudinal centerline of the roof 2 for the purpose of supporting the halves of the roof 2. Other forms of construction might be used, however.

The operation of my modified form shown in Figures 7, 8 and 9, which has the advantage of facilitating entrance to or exit from the auto using only one moveable panel per seat, and in which panel 6 may be raised at either end, is briefly described as follows.

The activating means for raising or lowering panel 6 in my modified form is substantially the same as that for activating my preferred form of moveable panel. That is, the electrically operated systems are arranged and function in substantially the same manner. However, the overlying magnetic pairs which cause upward or downward movement of panel 6 must be duplicated at each end of the panel 6, and are located within the panel 6 and within roof 2 along transverse side edges 16 and 13 thereof as shown in Figure 7. Additionally, the hinges, about which panel 6 will rotate must be of different construction and properly located. I suggest that the hinges be comprised of small tubes 41 and 41' affixed to, or shaped into, each end of panel 6, each tube extending completely across each respective end. In Figures 7 and 8 I show these tubes 41 and 41' as curled extensions of the panel 6 itself, with diameters of ⅜" or thereabouts. In similar manner, tubes 42 and 42' are affixed to, or shaped into, the side portions of roof 2, as shown in Figures 7 and 9. Thus, when panel 6 is in closed position, there is provided a uniform and aligned tube passage extending the length of each end of panel 6, and beyond, into the roof 2 at each side of panel 6. A total of four rods 43 connect panel 6 to roof 2, two of rods 43 within the tubes 41 and 42 at each side of the auotmobile, as shown in Figure 9, in a manner to interconnect tubes 41 and 41' with tubes 42 and 42'. Stopping pins 51 limit the distance to which rods 43 may penetrate the tubes 41 and 41'. The rods 43 should fit snugly, but not tightly, and when in the position described, interconnecting tubes 41 and 41' with tubes 42 and 42', serve to lock panel 6 in closed position. The bores of all tubes should be straight and smooth.

When it is desired to raise either end of panel 6 in my modified form, a manually operated switch 46 is moved to a positon "Up-1," completing an electric circuit to energize electromagnets 44 and 45 which are respectively affixed to the interior of the tubes 42, and to the rods 43. Electromagnets 44 and 45 are energized with opposite polarities, and the resulting attracting magnetic force causes withdrawal of rods 43 from the tubes 41 at one end of panel 6 only, whereupon panel 6 is in closed position disconnected from roof 2 at one side thereof. Switch 46 is then moved to a position "Up-2" to energize overlying electromagnet pairs 14 and 11, and 15 and 12 at the proper side with like polarities so that the resulting repelling magnetic force moves panel 6 to an open position at that side of the automobile body 1. As in my principal embodiment, the lifting action may be supplemented by mechanical spring-type means, perhaps located between the underside of panel 6 and my suggested longitudinal strength member 49 at the centerline of the roof 2. Panel 6 is then locked in open position by means similar to open-locking device 60 of my principal embodiment, as shown in Figures 4 and 5, and all circuits are thereupon deenergized.

To lower panel 6 to a closed position, switch 46 is moved to a position "Down-1" to complete the electric circuit necessary to cause unlocking of panel 6 from the open position. Switch 46 is then moved to a position "Down-2" to complete the electric circuit necessary to cause magnetic attraction between overlying electromagnet pairs 14 and 11 and 15 and 12, whereupon panel 6 is moved to the closed position. Contact of copper strip 37 across lead-wires at electro-mechanical contact point 38 causes completion of the electric circuit necessary to cause electromagnets 44 and 45 in tubes 42 and on rods 43 to be energized with like polarities. The resulting repelling electromagnetic force propels rods 43 into tube 41, causing panel 6 to be locked in place. If it is desired to raise and lower the opposite end of panel 6, a similar operation is performed.

My modified form may be provided with locking devices similar to locking devices 8 and 8', but located at the longitudinal center of the roof 2, to obtain a wedging and clamping action at the center of panel 6, assuring a weatherproof seal, as aforesaid.

It is to be understood that rods 43 may be made longer or shorter as convenient, and that their slideable action may be further assisted by an additional electromagnet in each end of panel 6, located within the tubes 41 and 41' near the center thereof, to propel rods 43 from the tubes 41 and 41', and to attract them thereinto, with greater magnetic force.

Additionally, my modified form of moveable panel may be provided with auxiliary electromagnets 58, located centrally on either transverse sides 16 and 16' thereof, overlying auxiliary electromagnets 58' located on either transverse sides 13 and 13' of roof opening 3 to assist the lifting action of electromagnets 11, 12, 14 and 15. This may be necessary because of the increased length of panel 6 and resulting rapid diminishing of electromagnetic force as panel 6 moves toward open position.

Thus, I have explained the operation of my modified form of panel 6 as shown in Figures 7, 8 and 9, but it is to be understood that headroom openings 3 above each of the doorways 4 of the automobile might be multiply-closed by a single panel in a variety of ways a longitudinal panel might be hinged along the longitudinal center of the roof 2 closing openings above two doorways on the same side of the automobile, or a transverse panel, extending across roof 2 from side to side of the automobile, might be hinged to an edge towards the front or rear of the car to close openings above doorways on opposite sides of the automobile. Other arrangements might be made to close a plurality of headroom openings using a single roof panel.

It is to be further understood that my moveable panel 6, as arranged in any of my suggested embodiments, may be moved to an open position entirely by mechanical spring means without departing from the principle of my invention. In such a case, the polarities of electromagnets 11, 12, 14 and 15 would be caused to remain in fixed, attracting relation whenever their circuit would become energized, operating only to close panel 6 by magnetic force.

It is to be further understood that manual mechanical locking means might be used in connection with my magnetic means for moving panel 6, in any of my suggested embodiments, also without departing from the principle of my invention.

It is further recognized that various types of braking means, of a mechanical or magnetic nature, might be incorporated into any of the embodiments of my invention to prevent too rapid opening or closing movement of panel 6. Additionally, it will be understood that areas or parts of the panel and of the automobile which are not intended to be affected by magnetic force, but which are sufficiently proximate to the magnets provided by the invention to be so affected, should be of materials not subject to magnetic attraction.

Further refinements of my panel and the construction thereof may be convenient or desirable.

One such refinement, which is preferred, is shown in Figure 3 wherein a V-shaped, interconnecting tongue 47 and groove 48 is formed on panel 6, and on roof 2 at the area of contact of panel 6, so as to assure a proper closing of panel 6 over headroom opening 3.

Initial activation of my method of providing increased headroom in automobiles might be obtained by use of means operable in conjunction with the door. I prefer, however, that activation of my system will be caused independently of the operation of any door for the reason that during times of inclement weather the occupant may not desire the panel to be opened so as to expose the interior of the automobile to the elements. But my method might be interconnected with the door opening operation without departing from the principles of my invention.

It is recognized that my panel must be made so as to tightly close the roof opening thereunder for the purpose of appearance, weatherproofing and the elimination of squeaks and noises during times of automobile movement. For this reason I suggest that weatherstripping 40, hereinbefore referred to, which is attached to the roof 2 be made thicker immediately adjacent the headroom opening 3 and slope downwardly away from the opening 3, and that the weatherstripping 39 attached to my panel 6 be made to slope in conforming direction, so that any water therebetween will flow away from the headroom opening 3 and so that jarring movement of my panel will be minimized. For the same reasons, the shape of my moveable panel 6 should conform nicely with the shape of the roof of the automobile, the interior longitudinal edge thereof in my principal embodiment, for example, curving as necessary to properly clear the usual bulbous longitudinal shape of the roof of modern automobiles. The dimensions of my panel and its area may be larger or smaller than that indicated in my drawings, as may be convenient or desirable.

In Figure 10 I have shown diagrammatically an operable electrical arrangement for the three interconnected electrically operated systems as described for operation of my principal embodiment shown in Figures 1 and 2. Switch 46 is shown to be a series of ganged switches A through I. It is to be understood, however, that other electrical arrangements may be devised without departing from the principles of my invention, and it is to be further understood that each of the systems could be made to operate independently from separate battery sources also without departing from my invention.

What I claim is:

1. In an automobile body having an access opening therein, a panel adapted to close said opening, attachment means between said panel and said body to movably attach the panel to the body, electromagnet means substantially adjacent said attachment means for moving said panel in cooperation with said attachment means to its fully open position with respect to said body, said electromagnet means applying magnetic force on said panel continuously during said movement, and electric circuit means for energizing said electromagnet means.

2. In an automobile body having an access opening therein, a panel adapted to close said opening, attachment means between said panel and said body to movably attach the panel to the body, electromagnet means substantially adjacent said attachment means for moving said panel in cooperation with said attachment means to its fully open position with respect to said body, said electromagnet means also for moving said panel in cooperation with said attachment means from its fully open position to its closed position with respect to said body, said electromagnet means applying magnetic force on said panel continuously during either said movement, and electric circuit means for energizing said electromagnet means, including means to reverse the magnetic polarity of at least a portion of said electromagnet means.

3. In an automobile body having an access opening therein, a panel adapted to close said opening, attachment means between said panel and said body to movably attach the panel to the body, spring-type mechanical means between said panel and said body biased against said panel for moving said panel in cooperation with said attachment means to its fully open position with respect to said body, electromagnet means substantially adjacent said attachment means for moving said panel against said bias in cooperation with said attachment means from its fully open position to its closed position with respect to said body, said electromagnet means applying magnetic force on said panel continuously during said closing movement, and electric circuit means for energizing said electromagnet means.

4. In an automobile body having an access opening therein, a panel adapted to close said opening, attachment means between said panel and said body to movably attach the panel to the body, panel opening means between said panel and said body comprising spring-type mechanical means biased against said panel and electromagnet means substantially adjacent said attachment means, said opening means for moving said panel in cooperation with said attachment means to its fully open position with respect to said body, said electromagnet means also for moving said panel against said bias in cooperation with said attachment means from its fully open position to its closed position with respect to said body, said electromagnet means applying magnetic force on said panel continuously during either said movement, and electric circuit means for energizing said electromagnet means, including means to reverse the magnetic polarity of at least a portion of said electromagnet means.

5. In an automobile body having an access opening therein, a panel hingedly attached at an edge portion thereof to said body at an edge portion of said opening and adapted to close said opening, said panel being rotatable to an open position with respect to said body, at least one electromagnet attached to said body substantially at said edge portion of said opening, at least one electromagnet attached to said panel substantially overlying said electromagnet attached to said roof, electric circuit means to energize said electromagnets to create like magnetic polarity in each of them to generate magnetic repulsion force therebetween for moving said panel to its fully open position with respect to said body, said magnetic repulsion force applied on said panel continuously during said opening movement, and means of said circuit to reverse the magnetic polarity of one of said electromagnets to generate magnetic attraction force between said electromagnets for moving said panel from its fully open position to its closed position with respect to said body, said magnetic attraction force applied on said panel continuously during said closing movement.

6. In an automobile body having an access opening therein, a panel hingedly attached at an edge portion thereof to said body at an edge portion of said opening and adapted to close said opening, said panel being rotatable to an open position with respect to said body, spring-type mechanical means between said panel and said body biased against said panel for moving said panel to its fully open position with respect to said body, at least one electromagnet attached to said body substantially at said edge portion of said opening, at least one electromagnet attached to said panel substantially overlying said electromagnet attached to said body, electric circuit means to energize said electromagnets to create opposite magnetic polarity in each of them to generate magnetic attraction force therebetween for moving said panel against said bias from its fully open position to its closed position with respect to said body, said magnetic attraction force applied on said panel continuously during said closing movement.

7. In an automobile body having an access opening therein, a panel hingedly attached at an edge portion thereof to said body at an edge portion of said opening and adapted to close said opening, said panel being rotatable to an open position with respect to said body, panel opening means between said panel and said body comprising spring-type mechanical means biased against said panel and magnetic means including at least one electromagnet attached to said body substantially at said edge portion of said opening and at least one electromagnet attached to said panel substantially overlying said electromagnet attached to said body, electric circuit means to energize said electromagnets to create like magnetic polarity in each of them to generate magnetic repulsion force therebetween whereby when said electromagnets are so energized said opening means move said panel to its fully open position with respect to said body, said magnetic repulsion force applied on said panel continuously during said opening movement, and means of said circuit to reverse the magnetic polarity of one of said electromagnets to generate magnetic attraction force between the said electromagnets for moving said panel against said bias from its fully open position to its closed position with respect to said body, said magnetic attraction force applied on said panel continuously during said closing movement.

8. The combination set forth in claim 2 wherein said attachment means comprise hinge means between the rear edge of said panel and the rear edge of said opening and wherein said electromagnet means comprise a plurality of relatively small electromagnets attached to said body arranged in a row in close spaced relation to each other along a side edge of said opening, and a plurality of relatively small electromagnets attached to said panel arranged in a row in close spaced relation to each other along the side edge of said panel corresponding to said side edge of said opening, the first said electromagnet in each of said rows substantially adjacent said hinge means.

9. The combination set forth in claim 3 wherein said attachment means comprise hinge means between the rear edge of said panel and the rear edge of said opening and wherein said electromagnet means comprise a plurality of relatively small electromagnets attached to said body arranged in a row in close spaced relation to each other along a side edge of said opening, and a plurality of relatively small electromagnets attached to said panel arranged in a row in close spaced relation to each other along the side edge of said panel corresponding to said side edge of said opening, the first said electromagnet in each of said rows substantially adjacent said hinge means.

10. The combination set forth in claim 4 wherein said attachment means comprise hinge means between the rear edge of said panel and the rear edge of said opening and wherein said electromagnet means comprise a plurality of relatively small electromagnets attached to said body arranged in a row in close spaced relation to each other along a side edge of said opening, and a plurality of relatively small electromagnets attached to said panel arranged in a row in close spaced relation to each other along the side edge of said panel corresponding to said side edge of said opening, the first said electromagnet in each of said rows substantially adjacent said hinge means.

11. In an automobile having an access doorway and having a hard roof, said roof having a headroom opening therein adjacent said access doorway, a panel moveably attached to said roof and adapted to close said headroom opening, a first electrically operated system including electromagnets disposed within said panel and within said roof for moving said panel to an open position and to a closed position, open-locking means for securing said panel in said open position, closed-locking means for securing said panel in said closed position, a second electrically operated system including at least one electromagnet for activating said closed-locking means, and a third electrically operated system including at least one electromagnet for activating said open-locking means, the said electrically operated systems being electrically and mechanically interconnected.

12. In a conventional automobile body having a hard roof and having at least two access doorways, means to provide a headroom opening adjacent each of said doorways, a moveable panel adapted to close a plurality of said headroom openings, electromagnetically detachable connecting means between said roof and said panel, and electromagnetic means for moving said panel in cooperation with said connecting means to an open position and to a closed position with respect to said roof.

13. The combination set forth in claim 12, the said panel and the said roof having weatherproofing means disposed therebetween, and the said connecting means effecting clamping action of said panel upon said body whereby said weatherproofing means provide a weatherproof seal between said panel and said roof when said panel is in said closed position.

14. In a conventional automobile body having a hard roof and having at least two access doorways, means to provide a headroom opening adjacent each of said doorways, a moveable panel adapted to close a plurality of said openings; electromagnetically detachable connecting means between said roof and said panel; opening means to move said panel in cooperation with said connecting means to an open position, said opening means comprising electromagnetic means and spring-type mechanical means; and closing means comprising said electromagnetic means to move said panel in cooperation with said connecting means to a closed position.

15. The combination set forth in claim 14, the said panel and the said roof having weatherproofing means disposed therebetween, and the said connecting means effecting clamping action of said panel upon said body whereby said weatherproofing means provide a weatherproof seal between said panel and said roof when said panel is in said closed position.

16. In a conventional automobile body having an access doorway and a headroom opening in the roof adjacent to and above said doorway, a panel hingedly attached at an edge portion thereof to said roof at an edge portion of said opening and adapted to close said opening, said panel being rotatable to an open position and to a closed position with respect to said roof; at least one electromagnet attached to said roof substantially at said edge portion of said opening; at least one electromagnet attached to said panel substantially overlying said electromagnet attached to said roof, the said electromagnet attached to said panel cooperating with the said electromagnet attached to said roof to rotate said panel to either of said positions; weatherproofing means disposed between said panel and said roof; and electromagnetically activated locking means for alternately locking and unlocking said panel when in said closed position, the said closed locking means effecting clamping action of said panel upon said body whereby said weatherproofing means provide a weatherproof seal between said panel and said roof when said panel is in said closed position.

17. In a conventional automobile body having an access doorway and a headroom opening in the roof adjacent to and above said doorway, a panel hingedly attached at an edge portion thereof to said roof at an edge portion of said opening and adapted to close said opening, said panel being rotatable to an open position and to a closed position with respect to said roof; spring-type mechanical means between said panel and said roof for rotating said panel to said open position; at least one electromagnet attached to said roof substantially at said edge portion of said opening; at least one electromagnet attached to said panel substantially overlying said electromagnet attached to said roof, the said electromagnet attached to said panel cooperating with the said electromagnet attached to said roof to rotate said panel to said closed position; weatherproofing means disposed between said panel and said roof; and electromagnetically activated closed-locking means for alternately locking and unlocking said panel when in said closed position, the said closed-locking means effecting clamping action of said panel upon said body whereby said weatherproofing means provide a weatherproof seal between said panel and said roof when said panel is in said closed position.

18. In a conventional automobile body having an access doorway and a headroom opening in the roof adjacent to and above said doorway, a panel hingedly attached at an edge portion thereof to said roof at an edge portion of said opening and adapted to close said opening, said panel being rotatable to an open position and to a closed position with respect to said roof; spring-type mechanical means between said panel and said roof; at least one electromagnet attached to said roof substantially at said edge portion of said opening; at least one electromagnet attached to said panel substantially overlying said electromagnet attached to said roof, the said mechanical means and the said electromagnets cooperating to rotate said panel to said open position, and the said electromagnets cooperating to rotate said panel to said closed position; open-locking means for alternately locking and unlocking said panel when in said open position; weatherproofing means disposed between said panel and said roof; and electromagnetically activated closed-locking means for alternately locking and unlocking said panel when in said closed position, the said closed-locking means effecting clamping action of said panel upon said body whereby said weatherproofing means provide a weatherproof seal between said panel and said roof when said panel is in said closed position.

19. In an automobile having an access doorway and having a hard roof, said roof having a headroom opening therein adjacent said access doorway, a panel movably attached to said roof and adapted to close said headroom opening, spring-type mechanical means for moving said panel to an open position, a first electrically operated system including electromagnets disposed within said panel and within said roof for moving said panel to a closed position, closed-locking means for securing said panel in a closed position, and a second electrically operated system including at least one electromagnet for activating said closed-locking means, the said electrically operated systems being electrically and mechanically interconnected.

20. In an automobile having an access doorway and having a hard roof, said roof having a headroom opening therein adjacent said access doorway, a panel movably attached to said roof and adapted to close said headroom opening, a first electrically operated system including opening means comprising electromagnets disposed within said panel and within said roof and spring-type mechanical means, said opening means for moving said panel to an open position and said electromagnets for moving said panel to a closed position, open-locking means for securing said panel in said open position, closed-locking means for securing said panel in said closed position, a second electrically operated system including at least one electromagnet for activating said closed-locking means, and a third electrically operated system including at least one electromagnet for activating said open-locking means, the said electrically operated systems being electrically and mechanically interconnected.

References Cited in the file of this patent

UNITED STATES PATENTS

| | | |
|---|---|---|
| 600,318 | Pletcher | Mar. 8, 1898 |
| 709,607 | Podlesak | Sept. 23, 1902 |
| 1,085,347 | Leduc | Jan. 27, 1914 |
| 2,253,252 | Smith | Aug. 19, 1941 |
| 2,325,225 | Burke | July 27, 1943 |
| 2,471,635 | Mark | May 31, 1949 |
| 2,499,749 | Hilliard | Mar. 7, 1950 |
| 2,584,480 | Manting | Feb. 5, 1952 |
| 2,651,542 | Meyer | Sept. 8, 1953 |
| 2,809,862 | Daniels | Oct. 15, 1957 |
| 2,815,977 | Podolan | Dec. 10, 1957 |
| 2,857,198 | Himka | Oct. 21, 1958 |

UNITED STATES PATENT OFFICE
CERTIFICATION OF CORRECTION

Patent No. 2,973,221            February 28, 1961

Edward L. Blackman

It is hereby certified that error appears in the above numbered patent requiring correction and that the said Letters Patent should read as corrected below.

Column 10, line 13, for "ways a" read -- ways. A --; column 11, lines 17 and 18, for "ing from the principles of my invention, and it is to be electrical arrangements may be devised without depart-" read -- electrical arrangements may be devised without departing from the principles of my invention, and it is to be --.

Signed and sealed this 1st day of August 1961.

(SEAL)
Attest:

ERNEST W. SWIDER
Attesting Officer

DAVID L. LADD
Commissioner of Patents